(12) United States Patent
Dikhit

(10) Patent No.: US 9,383,901 B1
(45) Date of Patent: Jul. 5, 2016

(54) METHODS AND APPARATUS FOR NAVAGATING DATA CENTER USING ADVANCED VISUALIZATION

(71) Applicant: Juniper Networks, Inc., Sunnyvale, CA (US)

(72) Inventor: Aniruddh S. Dikhit, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 290 days.

(21) Appl. No.: 13/729,525

(22) Filed: Dec. 28, 2012

(51) Int. Cl.
*G06F 3/048* (2013.01)
*G06F 3/0484* (2013.01)
*G06F 11/34* (2006.01)
*G06F 11/30* (2006.01)

(52) U.S. Cl.
CPC .......... *G06F 3/0484* (2013.01); *G06F 11/3055* (2013.01); *G06F 11/3466* (2013.01)

(58) Field of Classification Search
None
See application file for complete search history.

(56) References Cited

U.S. PATENT DOCUMENTS

| | | | | |
|---|---|---|---|---|
| 5,892,962 | A * | 4/1999 | Cloutier | G06F 15/8023 712/10 |
| 7,296,194 | B1 * | 11/2007 | Lovy | G06F 11/0709 709/224 |
| 8,051,383 | B2 * | 11/2011 | McCampbell | C02F 1/00 715/771 |
| 8,082,506 | B1 * | 12/2011 | McConnell | H04L 12/6418 709/223 |
| 2001/0028366 | A1 * | 10/2001 | Ohki | G06F 1/1616 715/772 |
| 2002/0002448 | A1 * | 1/2002 | Kampe | G06F 11/008 703/22 |
| 2002/0133584 | A1 * | 9/2002 | Greuel | H04L 12/2602 709/224 |
| 2003/0200347 | A1 * | 10/2003 | Weitzman | H04L 43/0817 719/310 |
| 2006/0294231 | A1 * | 12/2006 | Blencowe | G06F 11/327 709/224 |
| 2008/0034317 | A1 * | 2/2008 | Fard | G06F 3/0481 715/781 |
| 2009/0177666 | A1 * | 7/2009 | Kaneda | G06F 17/30067 |
| 2011/0093786 | A1 * | 4/2011 | McConnell | H04L 12/6418 715/736 |
| 2011/0119517 | A1 * | 5/2011 | Beeco | H04L 41/0677 713/340 |
| 2011/0191014 | A1 * | 8/2011 | Feng | G09G 5/00 701/532 |
| 2011/0282507 | A1 * | 11/2011 | Oudalov | H04B 3/54 700/292 |
| 2012/0005609 | A1 * | 1/2012 | Ata | G06F 11/0709 715/771 |
| 2012/0124503 | A1 * | 5/2012 | Coimbatore | G06F 11/328 715/772 |
| 2013/0065613 | A1 * | 3/2013 | Stopel | H04W 4/18 455/456.3 |
| 2013/0073605 | A1 * | 3/2013 | Fosburgh | G06F 11/3013 709/202 |
| 2013/0101235 | A1 * | 4/2013 | Sample | G09B 29/003 382/298 |

* cited by examiner

*Primary Examiner* — Hua Lu
(74) *Attorney, Agent, or Firm* — Cooley LLP

(57) ABSTRACT

In some embodiments, a method includes storing a set of data point values. Each data point value from the set of data point values is associated with a compute device from a set of compute devices that are included in a data center. The method also includes receiving a selection indicative of a region of the data center. A portion of the set of compute devices is disposed within the region of the data center. The method further includes sending a signal to display a topological map that includes a set of indicators. Each indicator from the set of indicators is associated with a compute device from the portion of the set of compute devices. A characteristic of an indicator from the set of indicators is based on a data point value of a respective compute device.

19 Claims, 4 Drawing Sheets

300

Store a set of data point values, each data point value from the set of data point values associated with a compute device from a set of compute devices that are included in a data center.
302

Receive a selection indicative of a region of the data center, a portion of the set of compute devices being disposed within the region of the data center.
304

Send a signal to display a topological map that includes a set of indicators, each indicator from the set of indicators associated with a compute device from the portion of the set of compute devices, a first characteristic of an indicator from the set of indicators based on a data point value of a respective compute device.
306

Receive a signal indicating that a data point value associated with a compute device from the set of compute devices is above a threshold.
308

Send a signal to display the topological map that includes the set of indicators, a second characteristic of the indicator from the set of indicators based on the data point value of the compute device being above the threshold.
310

```
┌─────────────────────────────────────────────┐
│ Receive, at a first time, a signal indicative│
│ of a selection of a first data point category.│
│                    402                       │
└─────────────────────────────────────────────┘
                    │
                    ▼
┌─────────────────────────────────────────────┐
│ Send a signal to display, after the first   │
│ time and before a second time, a topological│
│ map that includes a set of indicators, each │
│ indicator from the set of indicators        │
│ associated with a compute device from a set │
│ of compute devices, a characteristic of each│
│ indicator from the set of indicators based  │
│ on a data point value, associated with the  │
│ first data point category, of an associated │
│ compute device from the set of compute      │
│ devices.                                    │
│                    404                      │
└─────────────────────────────────────────────┘
                    │
                    ▼
┌─────────────────────────────────────────────┐
│ Receive, at the second time, a signal       │
│ indicative of a selection of a second data  │
│ point category.                             │
│                    406                      │
└─────────────────────────────────────────────┘
                    │
                    ▼
┌─────────────────────────────────────────────┐
│ Send a signal to display, after the second  │
│ time, the topological map such that the     │
│ characteristic of each indicator from the   │
│ set of indicators is displayed based on a   │
│ data point value, associated with the second│
│ data point category, of an associated       │
│ compute device from the set of compute      │
│ devices.                                    │
│                    408                      │
└─────────────────────────────────────────────┘
                    │
                    ▼
┌─────────────────────────────────────────────┐
│ Send a signal to display, at a third time   │
│ after the second time, a zoomed-in portion  │
│ of the topological map in response to a     │
│ signal indicative of a selection by a user. │
│                    410                      │
└─────────────────────────────────────────────┘
```

FIG. 4

METHODS AND APPARATUS FOR NAVIGATING DATA CENTER USING ADVANCED VISUALIZATION

BACKGROUND

Some embodiments described herein relate generally to visualization tools for data centers, and, in particular, to methods and apparatus for navigating and monitoring data centers using advanced visualization techniques.

Some known visualization tools are used to display information for devices or components that are distributed across and physically located at different locations within a data center. Such known visualization tools typically implement standard navigation mechanisms such as list, tree or grid map. For a large-scale data center that includes hundreds or thousands of devices or components, however, such known visualization tools may not be able to fit every device or component in the available window dimensions. Representing and selecting a particular device or component of the data center using those known visualization tools can also be challenging.

Accordingly, a need exists for methods and apparatus that can both display the topological view of a data center based on a selected metric in a very condensed fashion and provide a method to navigate down to a specific area of the data center.

SUMMARY

In some embodiments, a method includes storing a set of data point values. Each data point value from the set of data point values is associated with a compute device from a set of compute devices that are included in a data center. The method also includes receiving a selection indicative of a region of the data center. A portion of the set of compute devices is disposed within the region of the data center. The method further includes sending a signal to display a topological map that includes a set of indicators. Each indicator from the set of indicators is associated with a compute device from the portion of the set of compute devices. A characteristic of an indicator from the set of indicators is based on a data point value of a respective compute device.

BRIEF DESCRIPTION OF THE DRAWINGS

FIG. 3 is a flowchart illustrating a method for processing and displaying information for compute devices of a data center, according to an embodiment.

FIG. 4 is a flowchart illustrating a method for processing and displaying information for compute devices of a data center, according to another embodiment.

DETAILED DESCRIPTION

Figure 1:
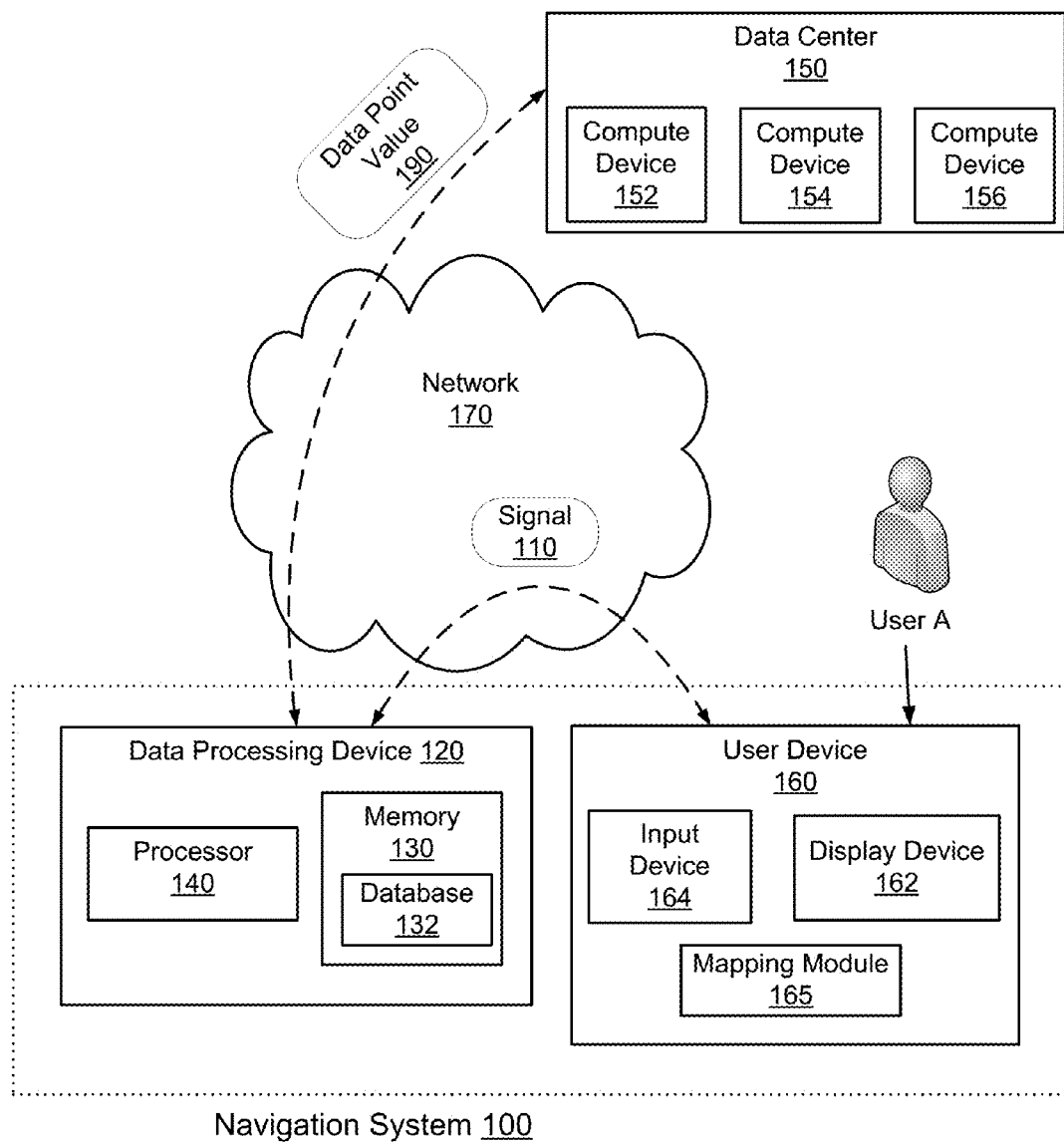
FIG. 1 is a schematic illustration of a navigation system configured to navigate a data center, according to an embodiment.

In some embodiments, a method executed at a navigation system includes storing a set of data point values. Each data point value from the set of data point values is associated with a compute device from a set of compute devices that are included in a data center. In some instances, such a data point value can be associated with, for example, a temperature of an associated compute device from the set of compute devices.

The method also includes receiving a selection indicative of a region of the data center. A portion of the set of compute devices is disposed within the selected region of the data center. The method further includes sending a signal to display a topological map that includes a set of indicators. Each indicator from the set of indicators is associated with a compute device from the portion of the set of compute devices. In the topological map, a characteristic of an indicator from the set of indicators is displayed based on a data point value of a respective compute device. In some instances, such a characteristic can be, for example, a color characteristic.

In some instances, the method includes receiving a signal indicating that a data point value associated with a compute device from the set of compute devices is above a threshold. The method further includes sending a signal to display the topological map that includes the set of indicators, where another characteristic of an indicator from the set of indicators is displayed based on the data point value of the compute device being above the threshold. In some instances, the other characteristic of the indicator can be, for example, a flashing color characteristic.

In some instances, the method includes storing another set of data point values. Each data point value from the other set of data point values is associated with a compute device from the set of compute devices. The method further includes sending a signal to display the topological map at another time. In the topological map displayed at the other time, the characteristic of an indicator from the set of indicators is based on a data point value, from the other set of data point values, of a respective compute device.

In some embodiments, a non-transitory processor-readable medium stores code representing instructions to be executed by a processor of a navigation system. The code represents instructions to cause the processor to receive, at a first time, a signal indicative of a selection of a first data point category. In some instances, such a first data point category can be, for example, a repair rate.

The code represents instructions to cause the processor to send a signal to display, after the first time and before a second time, a topological map that includes a set of indicators. Each indicator from the set of indicators is associated with a compute device from a set of compute devices. A characteristic of each indicator from the set of indicators is displayed based on a data point value of an associated compute device from the set of compute devices. The data point value is associated with the first data point category. In some instances, such a characteristic can be, for example, a relative position of an associated indicator on a display. In some instances, the topological map can be displayed in, for example, a grid format.

The code also represents instructions to cause the processor to receive, at the second time, a signal indicative of a selection of a second data point category. The code further represents instructions to cause the processor to send a signal to display, after the second time, the topological map such that the characteristic of each indicator from the set of indicators is displayed based on a data point value, associated with the second data point category, of an associated compute device from the set of compute devices.

Additionally, in some instances, the code can represent instructions to cause the processor to send a signal to display, from a time before the first time and until a time after the second time, a scrolling information strip displaying data associated with the set of compute devices. In some instances, the code can represent instructions to cause the processor to send a signal to display, at a third time after the second time, a zoomed-in portion of the topological map in response to a signal indicative of a selection by a user.

As used herein, a module can be, for example, an assembly of hardware or software modules (stored in memory and/or executing in hardware), or a set of operatively-coupled electrical components, and can include, for example, a memory, a processor, electrical traces, optical connectors, software (stored in memory and/or executing in hardware) and/or the like. As used herein, the singular forms "a," "an" and "the" include plural referents unless the context clearly dictates otherwise. Thus, for example, the term "an input device" is intended to mean a single device or a set of devices with similar functionalities associated with entering information or data.

FIG. 1 is a schematic illustration of a navigation system 100 configured to navigate a data center 150, according to an embodiment. The navigation system 100 includes a data processing device 120 and a user device 160 that are operatively coupled to the data center 150 via a network 170. Although not shown and described with respect to FIG. 1, in some embodiments, a navigation system can include more than one data processing device and/or more than one user device, and can be used to navigate more than one data center. For example, the data processing device 120 can be operatively coupled to and support more than one user device such that more than one user can access data from the data center 150 using the multiple user devices simultaneously. For another example, the user device 160 can be operatively coupled to more than one data processing device such that the user device 160 can retrieve different types of data from different data processing devices. For yet another example, the navigation system 100 can be operatively coupled to and used to navigate more than one data center such that a user can access data from the multiple data centers using a single user device. While shown and described below with respect to FIGS. 1-4 as a navigation system including a data processing device and a user device being used to navigate a data center, it should be understood that a navigation system including multiple data processing devices and/or multiple user devices can operate in a similar way to navigate one or multiple data centers.

The data center 150 can be any type of facility that is used to house one or multiple computer systems and associated components such as telecommunications systems and storage systems. The data center 150 includes a set of compute devices (e.g., compute devices 152, 154 and 156). In some embodiments, the data center 150 can include hundreds or thousands of compute devices. In some embodiments, although not shown in FIG. 1, the data center 150 can include other devices, equipment or components such as redundant or backup power supplies, redundant data communications connections, environmental controls (e.g., air conditioning, fire suppression), security devices, and/or the like. In some embodiments, a data center can be referred to as a computer center, or a data center network fabric.

A compute device (e.g., the compute device 152, 154, 156) included in the data center 150 can be any type of device, equipment or component that is used to store, process, and/or transmit data. Such a compute device can be, for example, a server, a storage device, a network port, a switch fabric node (e.g., a switch), a top-of-rack switch (TOR), etc. The compute devices included in the data center 150 are typically distributed across and physically located at different locations within an area within the data center 150. The location or position of each compute device can be identified on a floor map of the data center 150. In some embodiments, such a floor map can be a schematic illustration of the logical locations (e.g., relative locations) of the compute devices. In other embodiments, such a floor map can be a representation of physical locations (e.g., absolute locations) of the compute devices. In both scenarios, the floor map of the data center 150 can be displayed to a user via a topological view of the data center 150, as described in detail below with respect to FIG. 2.

The network 170 can be any type of network that operatively couples the data center 150 and the navigation system 100. The network 170 can be implemented as a wired network, a wireless network, or a combination of wired and wireless network. In some embodiments, the network 170 can be, for example, a local area network (LAN), a wide area network (WAN), a virtual network, a telecommunications network, the Internet, etc. In some embodiments, for example, the data processing device 120 can be connected to the data center 150 via an Internet service provider (ISP) and the Internet (e.g., network 170). Although shown in FIG. 1 as the data processing device 120 being operatively coupled to the data center 150 and the user device 160 through the network 170, in some embodiments, the data processing device 120 can be directly coupled to the data center 150 and/or the user device 160 without any intermediate device. For example, the data processing device 120 and the user device 160 can be collocated at a single platform that is directly connected to the data center 150.

The data processing device 120 can be any device with the capabilities of collecting, processing, and transmitting data. Specifically, the data processing device 120 can be configured to collect data from the data center 150, process the collected data, and send the processed data to the user device 160. In some embodiments, the data processing device 120 can be configured to function as, for example, a server device (e.g., a web server device), a computing device, a data management device, and/or so forth. As shown in FIG. 1, the data processing device 120 includes a processor 140, and a memory 130, which includes a database 132. Although not shown in FIG. 1, in some embodiments, the data processing device 120 can include other components such as one or more network interface devices (e.g., a network interface card, a communication port) configured to connect the data processing device 120 to the network 170 or other devices.

The processor 140 can be any processing device or component configured to perform the data collecting, processing and transmitting functions as described herein. In some embodiments, although not shown in FIG. 1, the processor 140 can include one or more than one module configured to perform different functions associated with the data collecting, processing, and transmitting. In such embodiments, the module(s) included in the processor 140 can be a hardware-based module (e.g., an Application-Specific Integrated Circuit (ASIC), a Digital Signal Processor (DSP), a Field Programmable Gate Array (FPGA)), a software-based module (e.g., a module of computer code executed at a processor, a set of processor-readable instructions executed at a processor), and/or a combination of hardware- and software-based modules. In some embodiments, the module(s) included in the processor 140 can be, for example, a process, application, virtual machine, and/or some other software module (stored in memory and/or executing in hardware) or a hardware module configured to perform the data collecting, processing and/or transmitting function.

The memory 130 can be, for example, a random access memory (RAM) (e.g., a dynamic RAM, a static RAM), a flash memory, a removable memory, a memory buffer, a hard drive, and/or so forth. In some embodiments, the memory 130 can act as a data repository for the data processing device 120. In such embodiments, for example, the data collected from the data center 150 can be stored within the memory 130. The database 132 can be any type of database that stores data collected from the data center 150. The database 132 can be implemented as, for example, a relational database, a table, a list, or any other suitable data structure. In some embodiments, the memory 130 can include more than one database, each of which can be used to store data collected from the data center 150 at one or more locations within the memory 130. Additionally, in some embodiments, data collected, from the data center 150 can be stored in an external data storage device (not shown in FIG. 1) operatively coupled to the data processing device 120.

The user device 160 can be any device that is used by a user to access and retrieve data or information associated with the data center 150. The user device 160 can be, for example, a personal computer, a host device, a server, a Personal Digital Assistant (PDA), a tablet, a smart phone, and/or the like. As shown in FIG. 1, the user device 160 can be accessed by a user A. Such a user can be one or a group of persons that can access and operate the user device 160 to navigate the data center 150 (e.g., via the data processing device 120). For example, the user A can be an administrator of the data center 150.

Although shown and described with respect to FIG. 1 as including two separate devices (the data processing device 120 and the user device 160), in some embodiments, the navigation system 100 can be implemented at a single device that incorporates the functions of the data processing device 120 and the user device 160 (e.g., data collecting, data processing, data displaying, etc.). For example, the navigation system 100 can be implemented at a computer server that can collect data from the data center 150 and display the collected data to a user.

As shown in FIG. 1, the user device 160 includes a mapping module 165, an input device 164 and a display device 162. The mapping module 165 can be a hardware-based module (e.g., an ASIC, a DSP, a FPGA), a software-based module (e.g., a module of computer code executed at a processor, a set of processor-readable instructions executed at a processor), and/or a combination of hardware- and software-based modules. In some embodiments, the mapping module 165 can be implemented at, for example, a processor (not shown in FIG. 1) of the user device 160. The mapping module 165 can be configured to execute functions associated with generating and/or determining information to be displayed on the display device 162. Specifically, the mapping module 165 an be configured to map information (e.g., selection of a data point category, selection of an area within the floor map of the data center) input by the user A using the input device 164 to information (e.g., data associated with a selected data point category, a portion of compute devices corresponding to a selected area within the floor map of the data center) to be displayed on the display device 162, as described in detail below with respect to FIG. 2. Although not shown and described with respect to FIGS. 1 and 2, in some embodiments, functionalities of such a mapping module as described herein can be executed at the data processing device 120. In such embodiments, information input by the user A can be sent from the user device 160 to the data processing device 120, where the information can be mapped (e.g., by a mapping module executed at the data processing device 120) to data and/or information to be displayed on the display device 162.

The input device 164 can be any device that is used by a user (e.g., the user A) to enter data, instructions or commands to the user device 160. The input device 164 can be, for example, a keyboard, a mouse, a touchpad stylus, an audio capture device, etc. The display device 162 can be any device that is used to display data or information associated with a data center (e.g., the data center 150) to a user (e.g., the user A). The display device 162 can be, for example, a monitor, a screen, projector, etc. Details of a display device are further described with respect to FIG. 2. In some embodiments, the functions of inputting data and displaying data can be implemented at a single device, such as a tablet equipped with a touchpad screen and a touchpad stylus, a laptop equipped with a screen and a keypad, a smart phone, etc.

The navigation system 100 can be used to navigate the data center 150 and monitor operations of the compute devices (e.g., the compute devices 152, 154, 156) within the data center 150. Specifically, the data processing device 120 can be configured to collect data point values (e.g., data point value 190) from the data center 150. The data point values collected from the data center 150 can be within one or more data point categories associated with the performance, operations, conditions, or status of all or a portion of the compute devices in the data center 150. Such data point categories can include, for example, repair rate (e.g., "3 times per month"), throughput (e.g., 100 Mbps), error rate (e.g., 0.5%), CPU utilization (e.g., 35%), temperature (e.g., 200° F.), operative status (e.g., "normal," "erroneous"), power consumption (e.g., 100 Watt), mean time-between-failure (e.g., 28 hours), etc., of a compute device. In some embodiments, the data point values collected from the data center 150 can be associated with various topological information pertaining to overall component health (e.g., fans, power supplies, Quad Small Form-factor Pluggable (QFSP) connector status, etc.) of the data center 150. In some embodiments, the data point values can be collected directly from the compute devices, or from sensors connected to the compute devices and/or other components of the data center 150.

In some embodiments, data collection from the data center 150 can be performed automatically and periodically. For example, the data processing device 120 can be configured to collect a data point value associated with the temperature of each compute device of the data center 150 once every minute without any interruption. For another example, the data processing device 120 can be configured to collect a data point value associated with the power consumption of each compute device of the data center 150 every hour. In some other embodiments, data collection from the data center 150 can be performed in an event-driven fashion. For example, an indication signal can be sent from a compute device of the data center 150 to the data processing device 120 immediately in response to that compute device's operative status changing from normal to erroneous. In yet some other embodiments, data collection from the data center 150 can be performed in an on-demand fashion. For example, after receiving a signal from the user device 160 indicating a request for throughput data of a specific group of compute devices, the data processing device 120 can be configured to retrieve a set of data point values associated with the throughput of the group of compute devices from the data center 150. In other embodiments, data can be collected from the data center in any other suitable method.

In some embodiments, a data point value in its complete form can be received from the data center 150 at the data processing device 120. For example, a temperature value in its complete form (e.g., 200° F., 250° F.) of the compute device 152 can be received from the compute device 152 at the data processing device 120. In some other embodiments, if a previous value of a data point value is already stored at the data processing device 120, a change in the data point value (that is, the difference between the previous value and a new value of the data point value), rather than the new value in its complete form, can be received from the data center 150 at the data processing device 120. For example, a change-of-temperature value (e.g., +2° F., −5° F.) of the compute device 154 can be received from the compute device 154 at the data processing device 120. In other embodiments, data point values can be collected from the data center in any other suitable method.

After data point values are received at the data processing device 120, the data processing device 120 can be configured to store the received data point values in the memory 130 (e.g., in the database 132). Data point values can be stored in the memory 130 in any suitable means. For example, data point values can be stored based on their categories. That is, data point values associated with different data point categories can be stored in different databases or different tables in the same database. For another example, data point values can be stored based on their associated compute devices. That is, data point values associated with different compute devices can be stored in different databases or different tables in the same database.

Furthermore, data point values stored in the memory 130 can be updated in response to new data point values being received from the data center 150 at the data processing device 120. In some embodiments, such updates can be performed periodically or according to a certain schedule as data point values are periodically collected or collected according to the certain schedule from the data center 150. In some other embodiments, such an update can be performed dynamically as data point values are received at the data processing device 120 in response to an event, a demand, and/or the like. In yet some other embodiments, such an update can be manually performed by, for example, an operator of the navigation system 100.

In some embodiments, as described in detail below with respect to FIG. 2, the user A can operate the user device 160 to make a request for information associated with all or a portion of the compute devices within the data center 150. As a result, the user device 160 can be configured to send a signal (e.g., the signal 110) indicating the request to the data processing device 120. In response to receiving the signal, the data processing device 120 can be configured to locate respective data point value(s) collected from the corresponding compute device(s) of the data center 150 that is used to determine the requested information. In some embodiments, as discussed above with respect to the on-demand fashion of data collection, if the relevant data point value(s) is not available at the data processing device 120, the data processing device 120 can be configured to retrieve that data point value(s) from the corresponding compute device(s) of the data center 150. In other embodiments, if the relevant data point value(s) is available at the data processing device 120, that data point value(s) can be retrieved from the memory 130 of the data processing device 120 for further processing.

Next, the data processing device 120 can be configured to determine the requested information based on the respective data point value(s) associated with the corresponding compute device(s) of the data center 150. The data processing device 120 can then be configured to send a signal (e.g., the signal 110) including the requested information to the user device 160. In some embodiments, the requested information can be determined by processing the respective data point value(s). For example, a data point value can be compared to one or a series of predetermined thresholds. As a result, a relative position of the data point value with respect to the threshold(s) can be determined. The relative position of the data point value can then be sent from the data processing device 120, as the requested information, to the user device 160. In other embodiments, if the raw data point value(s) is requested by the user A, the raw data point value(s) can be sent from the data processing device 120 to the user device 160 without any processing. After receiving the requested information from the data processing device 120, the user device 160 can display the received information via the display device 162.

Figure 2:
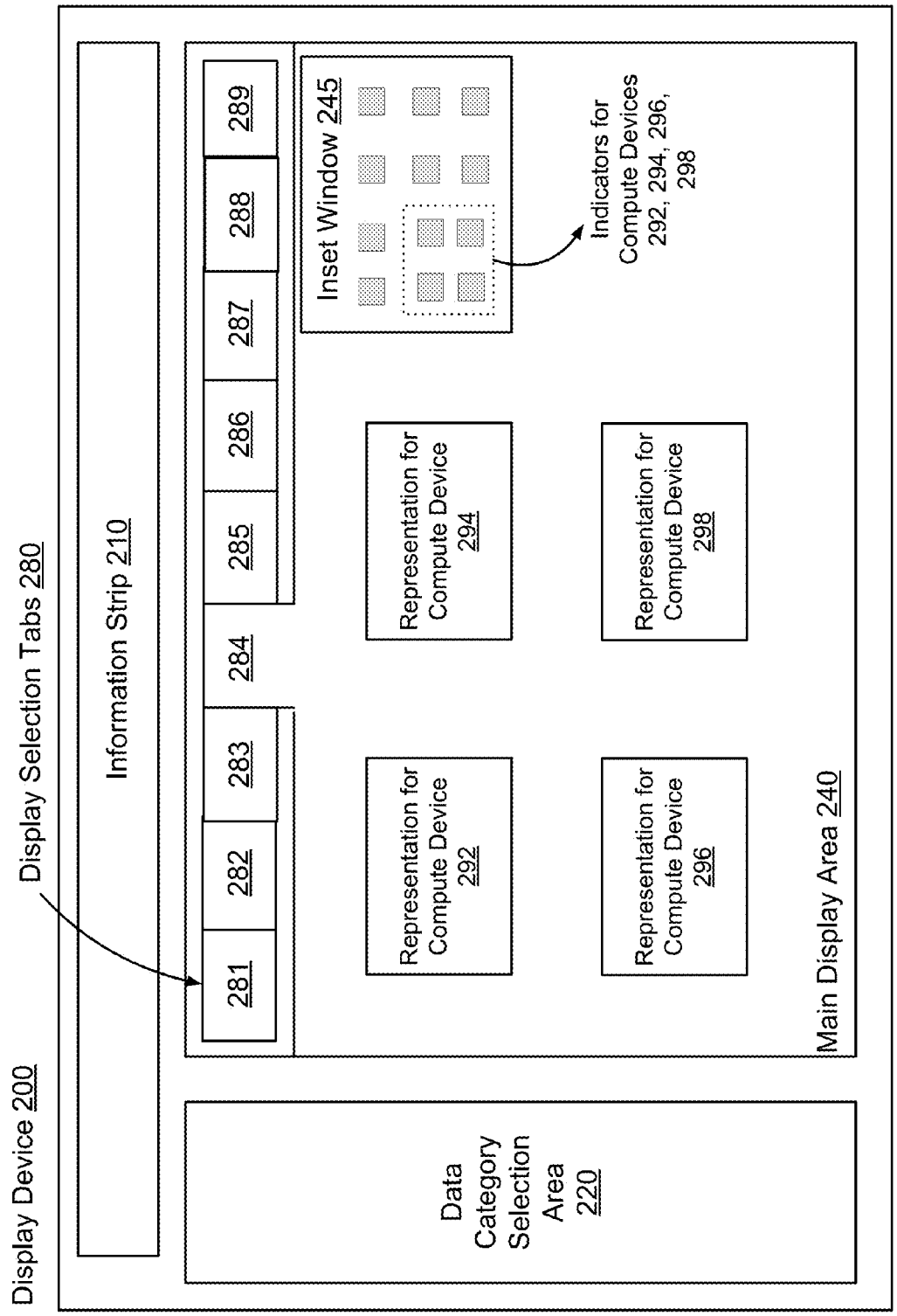
FIG. 2 is a schematic illustration of a display device configured to display information for compute devices of a data center, according to an embodiment.

FIG. 2 is a schematic illustration of a display device 200 configured to display information for compute devices of a data center, according to an embodiment. The display device 200 can be structurally and functionally similar to the display device 162 shown in FIG. 1. Specifically, the display device 200 can be included in a user device (e.g., the user device 160 in FIG. 1) of a navigation system (e.g., the navigation system 100 in FIG. 1). The user device can be operated by a user (e.g., the user A in FIG. 1). The navigation system can be operatively coupled to a data center (e.g., the data center 150 in FIG. 1) including a set of compute devices (e.g., the compute devices 152, 154, 156). The navigation system can also include a data processing device (e.g., the data processing device 120 in FIG. 1). The display device 200 is used to display information or data that is collected from the compute devices of the data center by the data processing device.

As shown in FIG. 2, the display area (e.g., display area of a screen) of the display device 200 includes a set of sub-display areas such as an information strip 210, a data category selection area 220, a main display area 240, and/or the like. In some embodiments, the display area of the display device 200 can include more or less sub-display areas, which can be arranged in any other suitable means to display information to a user. For example, the data category selection area 220 can be positioned within the main display area 240 and surrounded by other sub-display areas or components. For another example, the information strip 210 can be dynamically displayed at various positions on the display area, and/or can move from one position to another position from time to time.

The main display area 240 can be a collapsible topology map window. Specifically, as shown in FIG. 2, a set of display selection tabs 280 can be displayed at the top (or any other position) of the main display area 240. Each display selection tab 280 corresponds to a different category of contents, data or information associated with the data center that can be displayed on the main display area 240. Such display selection tabs 280 can include, for example, topology, dashboard, inventory, utilization, faults, logs, console, etc. When a particular display selection tab 280 is selected by a user, the corresponding contents, data and/or information is displayed on the remaining area of the main display area 240. For example, when the display selection tab 284, topology, is selected as shown in FIG. 2, a topological map of the data center can be displayed in the remaining area of the main display area 240. For another example, when the display selection tab for faults is selected, records of the faults that occurred at the data center can be displayed in the remaining area of the main display area 240.

As shown in FIG. 2, the main display area 240 can include an inset window 245 located inside the main display area 240, for example, at the top right corner (or any other position). In such embodiments, the inset window 245 can display a condensed floor map of the data center including each compute device of the data center. Specifically, the inset window 245 can be proportionately partitioned in tiles based on the actual placement of compute devices on the floor map of the data center. Each tile has a fixed number of pixels. For example, if a tile has 10×10 pixels, then an inset window of 40×30 pixels can be partitioned into 4×3 tiles (as shown in FIG. 2); an inset window of 120×120 pixels can be partitioned into 10×10 tiles; and an inset window of 250×250 pixels can be partitioned into 25×25 tiles.

As discussed above with respect to the data center 150 in FIG. 1, the floor map of the data center that identifies placement of compute devices can be a representation of the logical locations (e.g., relative locations) or physical locations (e.g., absolute locations) of the compute devices. In both scenarios, each compute device of the data center can be represented by an indicator that can be displayed in the inset window 245. In some embodiments, such an indicator can be associated with a tile of the inset window 245, and displayed using that tile. Thus, the maximum number of compute devices that the inset window 245 can represent is the number of tiles included in the inset window 245. For example, 128 TORs can be represented in an inset window of 12×12 tiles; 625 compute devices can be represented in an inset window of 25×25 tiles.

In some embodiments, the size of the inset window 245 can be changed such that data centers with various numbers of compute devices can be represented in the inset window 245. For example, if an indicator for a compute device is displayed using a tile and a tile has 10×10 pixels, then to represent a first data center including 100 compute devices, the inset window 245 can be increased in size to display at least 100 tiles. Thus, the inset window 245 with a size of 100×100 pixels is sufficient. To represent a second data center including 200 compute devices, the inset window 245 can be increased in size to display at least 200 tiles. Thus, the inset window 245 can change to a size of 150×150 pixels to include 225 tiles.

In some other embodiments, alternatively, the size of an inset window is fixed and the size of a tile can be changed. For example, the inset window can have a fixed size of 100×100 pixels. To represent the first data center including 100 compute devices, the size of a tile can be as large as 10×10 pixels. To represent the second data center including 200 compute devices, the size of a tile can be reduced to 6×6 pixels, such that the inset window can have at least 225 tiles.

In the example of FIG. 2, a data center including as many as 12 compute devices (e.g., compute devices 292, 294, 296, 298) is represented in the inset window 245. Specifically, each compute device of the data center is represented by an indicator (the gray square in the inset window 245). In some embodiments, one or more characteristics of an indicator associated with a compute device can be displayed in the inset window 245. Such a characteristic of an indicator can be, for example, a color characteristic (e.g., red, green, yellow), a shape characteristic (e.g., square, triangle, circle), a size characteristic (e.g., large, medium, small), a status characteristic (e.g., flashing, static-on, static-off), a dimension characteristic (e.g., a 2-dimensional (2D) image, a 3-dimensional (3D) image), patterns (e.g., horizontal lines, vertical lines, diagonal lines, etc), density of dots and/or pixels to represent a gradient, combinations of characteristics, and/or the like.

A characteristic of an indicator associated with a compute device can be displayed based on one or more data point values of that compute device that are collected and processed at the data processing device. In some embodiments, an indicator can be displayed with a certain characteristic value when an associated data point value crosses a predetermined threshold or satisfies a specific requirement according to a rule. Such a rule can be associated with displaying a certain type of information for compute devices of the data center. In such embodiments, for example, a data point value of a compute device can be processed based on the rule at the data processing device. A result can be determined according to the rule. The data processing device can then send an indication of the result to the user device, such that the indicator associated with that compute device can be displayed with a certain characteristic according to the rule in the inset window 245.

For example, a temperature rule can be associated with displaying temperature information for compute devices. According to such a temperature rule, for example, when the temperature of a compute device crosses a critical threshold (e.g., 200° F.), the indicator associated with the compute device will be displayed in red; when the temperature of the compute device crosses a warning threshold (e.g., 150° F.) but is below the critical threshold, the indicator associated with the compute device will be displayed in yellow; when the temperature of a compute device is below the warning threshold, the indicator associated with the compute device will be displayed in green. Thus, when the user requests temperature information of compute devices of the data center, the temperature rule is triggered at the data processing device. As a result, a temperature value of each compute device is compared with the two thresholds at the data processing device. A result for each compute device is determined according to the temperature rule, and an indication of the result is then sent from the data processing device to the user device. In response to receiving the indications, the user device displays the indicators associated with the compute devices with the certain color characteristics based on the received indication. Specifically, indicators associated with compute devices whose temperature values are above the critical threshold are displayed in red; indicators associated with compute devices whose temperature values are between the critical threshold and the warning threshold are displayed in yellow; and all the remaining indicators are displayed in green. In some embodiments, a heat map of the data center can be displayed in the inset window 245 using such a temperature rule.

For another example, a fault-alert rule can be associated with alerting the user for a specific fault (e.g., power outage) occurring at the compute devices. According to such a fault-alert rule, for example, when the specific fault occurs at a compute device, the indicator associated with the compute device will display a flashing 3D image of a warning sign. Thus, when the fault-alert rule is triggered at the data processing device, data point values of each compute device that is associated with detecting the specific fault at that compute device are constantly monitored. Whenever the specific fault is detected at a compute device, an indication of the detection is sent from the data processing device to the user device according to the fault-alert rule. As a result, the flashing 3D image of the warning sign is displayed at the indicator associated with the faulty compute device.

In some embodiments, a portion or whole of the image displayed in the inset window 245 can be zoomed-in and displayed in the main display area 240. Similar to the user device 160 shown and described with respect to FIG. 1, the user device that contains the display device 200 can also include an input device structurally and functionally similar to the input device 164, and a mapping module structurally and functionally similar to the mapping module 165. The user operating the user device can use the input device (e.g., a mouse, a keyboard) to identify an area or select a set of indicators within the inset window 245. In the example of FIG. 2, the user can use a touchpad stylus, a mouse, or any other suitable input means to identify an area (shown as the area included within the broken-line) in the inset window 245 that includes the indicators for the compute devices 292, 294, 296 and 298. Alternatively, the user can use the mouse, a keyboard, or any other suitable input means to select the compute devices 292, 294, 296 and 298.

Next, the mapping module of the user device can recognize the identified area or the selected indicators. The mapping module can then identify, based on the identified area or the selected indicators, the compute devices in which the user is interested. For example, when an area within the floor map of the data center is selected by the user, the mapping module can be configured to map the selected area to identifiers of computer devices that are included in the corresponding area of the data center based on a database. Such a database can store position information of each compute device included in the data center. Furthermore, when the floor map of the data center is displayed in the inset window 245, a position in the inset window 245 for the indicator of each compute device can be determined from the corresponding entry of the database, such that an identifier of a compute device can be associated with the position in the inset window 245 for the indictor of that compute device. Thus, using the database, the mapping module can determine identifiers of the selected compute devices based on position information of the selected area in the inset window 245.

The mapping module can then send a signal to the display device 200 indicating that those compute devices are selected by the user. In response to receiving the signal, the display device 200 can display representations of the selected compute devices in the main display area 240. Furthermore, in some embodiments, if more data or information associated with the selected compute devices is to be displayed in the main display area 240, the mapping module can send a signal to the data processing device, such that the data or information can be retrieved and send from the data processing device to the user device.

The representations of the selected compute devices that are displayed in the main display area 240 can be, for example, an image, data, information, and/or in any other displayable format, associated with the selected compute devices. In some embodiments, the representation of a selected compute device can be a merely zoomed-in image of the corresponding indicator associated with the compute device that is displayed in the inset window 245. For example, if the floor map of the data center displayed in the inset window 245 is too condensed and not very viewable to the user, the user can zoom in a portion of the floor map in the main display area 240, such that the user can view an enlarged representation of the indicators included in that portion.

In other embodiments, the representation of a selected compute device can include extra detailed image, information or data for the selected compute device that is not displayed in the inset window 245. For example, the representation of a selected compute device can be a photographic image of the selected compute device. For another example, the representation of a selected compute device can include detailed data point values associated with the compute device such that the user can have a close inspection on the data. For yet another example, the representation of a selected compute device can include a set of extra information of the selected compute device, such as type, manufacture, serial number, location, and/or the like.

In the example of FIG. 2, the user selects the indicators for the compute devices 292, 294, 296 and 298 in the inset window 245. As a result, a representation of each of the selected compute devices 292-298 is displayed in the main display area 240 as shown in FIG. 2. Such a representation can include, for example, an image of the compute device, data point values of the compute device, and/or any other data or information associated with the compute device.

As described above, the display device 200 can be used to display information for the compute devices of the data center in multiple-layer views (with various levels of abstraction and/or details) using the inset window 245 and the main display area 240. In some embodiments, a display device can be used to display such multiple-layer views for the data center without using an insert window. In such embodiments, a main display area of the display device can initially be used to display an overview of the floor map of the data center, which includes an indicator for each compute device of the data center. Such an overview display is similar to the floor map displayed in the inset window 245 as described above. Similar to the operations on the insert window 245 described above, the user can select a set of compute devices by identifying an area or selecting a set of indicators on the main display area. As a result, representations of the selected compute devices can be displayed on the main display area to replace the overview picture of the floor map. Furthermore, in some embodiments, the display device 200 can be used to display information for the data center in views of more than two layers.

The data category selection area 220 can be used by the user to select one or more data point categories. Selecting data point categories can be implemented using any suitable method such as a graphical user interface (GUI) element (e.g., a knob, a drop-down menu, a list of selectable items, a navigation tree, a content pane, etc.). In such embodiments, the GUI element can be displayed in the data category selection area 220, and the user can select one or more data point categories by manipulating the GUI element accordingly (e.g., adjusting the knob to a certain position, selecting an item in the drop-down menu, etc.). The manipulation of the GUI element can then be mapped by, for example, the mapping module of the user device 200 (e.g., the mapping module 165 of the user device 160 in FIG. 1) to a selection of the one or more data point categories. Information associated with the selected data point categories can then be used by the mapping module to determine appropriate data to be displayed on the display device 200.

Next, data associated with the selected data point categories can then be used as basis for rendering indicators and/or representations of the corresponding compute devices in the main display area 240 (including the inset window 245). That is, data point values associated with the selected data point categories, or information inferred or derived from the data point values associated with the selected data point categories, can be displayed in the main display area 240 (including the inset window 245). For example, if a data point category of temperature is selected in the data category selection area 220, information inferred or derived from the temperature values of the compute devices, such as a heat map of the data center, can be displayed in the main display area 240. For another example, if a data point category of throughput is selected in the data category selection area 220, throughput values of the compute devices or information inferred or derived from those throughput values can be displayed in the main display area 240.

In some embodiments, more than one data point category can be selected in the data category selection area 220 at the same time. As a result, various types of data point values, or information inferred or derived from those data point values, can be displayed in the main display area 240 (including the inset window 245) in a combined fashion. For example, if data point categories of error rate and repair rate are both selected, an indicator of error rate for a compute device and an indicator of repair rate for the compute device can be displayed side by side or in any other suitable arrangement at the allocated position for that compute device in the inset window 245. Similarly, when that compute device is selected by the user from the inset window 245, an error rate value and a repair rate value of that compute device can both be included in the representation for the compute device and displayed in the main display area 240. For another example, if data point categories of temperature and operative status are both selected, an indicator of a compute device can be displayed in the inset window 245, with a certain characteristic (e.g., color) based on a temperature value of the compute device if the operative status of that compute device is normal. Whenever the operative status of the compute device changes from normal to erroneous, the indicator of the compute device will be configured to display a warning sign to alert the user.

In some embodiments, when one or more data point categories are selected, one or more rules associated with the selected data point categories can be triggered to process data point values of the selected data point categories. For example, if a data point category of temperature is selected, the temperature rule described above can be triggered to process temperature values (data point values having temperature information) of compute devices, such that indicators can be displayed with a color characteristic based on the temperature values of the associated compute devices. For another example, when a data point category of fault status is selected, the fault-alert rule described above can be triggered to monitor data point values associated with detecting faults at the compute devices, such that indicators can be displayed with a certain characteristic associated with alerting the user (e.g., a flashing 3D image) based on the corresponding data point values of the associated compute devices.

In some embodiments, a rule can be associated with more than one data point category. For example, a usage rule designed to measure usage of a compute device can be associated with data point categories of CPU utilization and power consumption. For another example, a robustness rule designed to measure robustness of a compute device can be associated with data point categories of repair rate and error rate. In such embodiments, the rule associated with a combination of data point categories can be triggered by the user explicitly or implicitly. For example, a category of usage, which is a combination of the data point categories of CPU utilization and power consumption, can be created and displayed in the data category selection area 220. By selecting the category of usage, the user explicitly triggers the usage rule. For another example, by selecting the data point categories of repair rate and error rate separately, the user implicitly triggers the robustness rule.

In some embodiments, the rules associated with processing data for the compute devices can be defined, maintained, and updated at a rule engine. Such a rule engine can be implemented and executed at the user device or the data processing device. In some embodiments, any user can define and/or change a rule by using the user device. In other embodiments, only a certain set of users (e.g., administrator) can be authorized to define and/or change a rule.

The information strip 210 can be used to display information (e.g., important or emergent information) associated with the data center that typically involves the user's immediate attention. For example, the information strip 210 can be configured to display an alarm message, indicating that a power outage is occurring at a compute device in the data center. For another example, the information strip 210 can be configured to display an alert message, indicating that a particular compute device is malfunctioning in the data center.

In some embodiments, the information displayed in the information strip 210 is not displayed in the main display area 240 (including the inset window 245). For example, when information associated with temperature and throughput of compute devices is displayed in the main display area 240, the information strip 210 can be configured to display an alarm message indicating a failure at a specific area of the data center. Thus, the user's attention can be drawn to an emergent event or situation even when the user is examining other information of the data center.

In other embodiments, the information strip 210 can display information that has been or is being displayed in the main display area 240. Thus, the information can be conveyed to the user in multiple methods and/or at multiple times such that the user can be fully aware of the seriousness of the matter. For example, after the user selects the data point category of error rate in the data category selection area 220, information of error rate at each compute device can be displayed in the main display area 240 (including the inset window 245). Additionally, information of compute devices with an error rate value higher than a critical threshold can be displayed in the information strip 210 to further draw the user's attention to those compute devices. For another example, after the user checks data associated with a faulty compute device, information associated with that compute device can be continuously or periodically displayed in the information strip 210 to remind the user, until the compute device is repaired.

The information strip 210 can implement any suitable processes or techniques to display information. In some embodiments, for example, the information strip 210 can be configured to display information using visual effects techniques such as animation, flashing characteristics, changing-color, scrolling message, etc. Additionally, in some embodiments, audio techniques can also be used when information is displayed in the information strip 210. For example, an alarming sound can be played when an alarm message is displayed in the information strip 210.

FIG. 3 is a flowchart illustrating a method 300 for processing and displaying information for compute devices of a data center, according to an embodiment. Instructions associated with the method can be stored in a memory of a data processing device (e.g., the memory 130 of the data processing device 120 in FIG. 1) and executed at a processor of the data processing device (e.g., the processor 140 of the data processing device 120 in FIG. 1). Furthermore, similar to the navigation system 100 shown and described with respect to FIG. 1, the data processing device is operatively coupled to a user device (e.g., the user device 160 in FIG. 1).

At 302, a set of data point values can be stored in the memory of the data processing device. The data point values can be received from the data center at the data processing device. Each data point value from the set of data point values can be associated with a compute device from a set of compute devices included in the data center. Each data point value from the set of data point values can include, for example, a temperature, repair rate, throughput, error rate, CPU utilization, etc., of a compute device from the set of compute devices.

At 304, a selection indicative of a region of the data center can be received at the data processing device. The selection can be received from a user that identifies an area on a floor map of the data center by operating, for example, the user device. In some embodiments, the area on the floor map of the data center that is identified by the user can be mapped to the region of the data center by, for example, a mapping module executed at the user device (e.g., the mapping module 165 of the user device 160 in FIG. 1), as described in detail above with respect to FIG. 2. As a result, a portion of the set of compute devices that is disposed within the region of the data center can be identified.

At 306, a signal can be sent from the data processing device to a display device to display a topological map that includes a set of indicators. Each indicator from the set of indicators is associated with a compute device from the portion of the set of compute devices. Such a topological map can be displayed in an inset window (e.g., the inset window 245 in FIG. 2) or a main window (e.g., the main display area 240 in FIG. 2) of the display device. In the topological map, a first characteristic of an indicator from the set of indicators can be displayed based on a data point value of a respective compute device. The first characteristic of an indicator can be, for example, a color characteristic, a flashing color characteristic, a shape characteristic, a size characteristic, etc.

Furthermore, the topological map can be changed based on the data point values received at the data processing device. Specifically, after a new set of data point values is received at the data processing device, the steps of 302, 304 and 306 can be repeated such that a new topological map can be displayed in the display device. In the new topological map, a characteristic of an indicator from a set of indicators can be displayed based on a data point value of a respective compute device from the new set of data point values.

At 308, a signal can be received at the data processing device indicating that a data point value associated with a compute device from the set of compute devices is above a threshold. In some embodiments, the comparison can be performed at the data processing device as a result of enforcing a rule on the data point value. The rule can be associated with displaying information for the compute devices of the data center.

At 310, a signal can be sent from the data processing device to the display device to display the topological map that includes the set of indicators. A second characteristic of the indicator from the set of indicators can be displayed based on the data point value of the compute device being above the threshold. The second characteristic of the indicator can be different than the first characteristic of the indicator. For example, the first characteristic can be a static color, and the second characteristic can be a flashing color.

FIG. 4 is a flowchart illustrating a method 400 for processing and displaying information for compute devices of a data center, according to another embodiment. The code representing instructions to perform the method 400 can be stored in, for example, a non-transitory processor-readable medium (e.g., a memory) in a data processing device of a navigation system, which is similar to the data processing device 120 of the navigation system 100 shown and described with respect to FIG. 1. The code can be executed by, for example, a processor (e.g., the processor 140 in FIG. 1) of the data processing device. Furthermore, the data processing device can be operatively coupled to a data center and a user device, which are similar to the data center 150 and the user device 160, respectively, shown and described with respect to FIG. 1. The code stored in the non-transitory processor-readable medium includes code to be executed by the processor to cause the data processing device to perform the operations illustrated in FIG. 4 and described as follows.

At 402, the data processing device can be configured to receive, at a first time, a signal indicative of a selection of a first data point category. The signal can be received from the user device as a result of a user selecting the first data point category (e.g., using the user device). The first data point category can be, for example, a repair rate, temperature, throughput, error rate, or fault status, etc.

At 404, the data processing device can be configured to send a signal to display, after the first time and before a second time, a topological map that includes a set of indicators. The topological map can be displayed on a display of the display device. Each indicator from the set of indicators is associated with a compute device from a set of compute devices included in the data center. Furthermore, a characteristic of each indicator from the set of indicators can be displayed based on a data point value associated with the first data point category and of an associated compute device from the set of compute devices.

In some embodiments, the topological map can be displayed in, for example, a grid format. In some embodiments, the characteristic of each indicator from the set of indicators can be a relative position of that indicator on the display of the display device. For example, the characteristic of each indicator can be a bar in a 3D image, where the indicator of a compute device having a relatively larger data point value is displayed with a higher bar on the display.

At 406, the data processing device can be configured to receive, at the second time, a signal indicative of a selection of a second data point category. Similar to the signal associated with the selection of the first data point category, the signal indicative of the selection of the second data point category can be received from the user device as a result of the user selecting the second data point category (e.g., using the user device).

At 408, the data processing device can be configured to send a signal to display, after the second time, the topological map such that the characteristic of each indicator from the set of indicators is displayed based on a data point value, associated with the second data point category, of an associated compute device from the set of compute devices.

At 410, the data processing device can be configured to send a signal to display, at a third time after the second time, a zoomed-in portion of the topological map in response to a signal indicative of a selection by the user. As described above with respect to FIG. 2, the user can identify an area within the topological map or select a portion of the set of compute devices on an inset window (e.g., the inset window 245 in FIG. 2) of the display device. As a result, the identified area of the topological map or the selected compute devices can be displayed in a main display (e.g., the main display area 240 in FIG. 2) of the display device in a zoomed-in fashion.

Additionally, in some embodiments, the data processing device can be configured to send a signal to display, from a time before the first time and until a time after the second time, a scrolling information strip displaying data associated with the set of compute devices. Such a scrolling information strip can be displayed at a specific area in the display of the display device (e.g., the information strip 210 in the display of the display device 200 shown in FIG. 2), as described above with respect to the information strip 210 in FIG. 2.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A method, comprising
storing a plurality of data point values, each data point value from the plurality of data point values associated with a compute device from a plurality of compute devices that are included in a data center;
receiving a selection indicative of a region of the data center;
mapping, via a mapping module implemented by at least a processor, the region of the data center, to position data stored in a database record associated with a portion of compute devices from the plurality of compute devices; and
sending a signal to display a topological map that includes a plurality of indicators and a set of tiles in an inset window, a number of the set of tiles corresponding to a number of indicators within the plurality of indicators, each indicator from the plurality of indicators associated with a compute device from the portion of the plurality of compute devices, and a characteristic of an indicator from the plurality of indicators, the characteristic being based on a data point value of a respective compute device from the plurality of data point values, the signal including instructions to display the topological map such that each tile in the plurality of tiles changes in size to collectively fit within the inset window.

2. The method of claim 1, wherein each data point value from the plurality of data point values is associated with a temperature of an associated compute device from the plurality of compute devices.

3. The method of claim 1, wherein the plurality of data point values are a first plurality of data point values, and wherein sending a signal to display the topological map includes sending a signal to display the topological map at a first time, the method further comprising:
storing a second plurality of data point values, each data point value from the second plurality of data point values associated with a compute device from the plurality of compute devices;
sending a signal to display the topological map at a second time different from the first time, the characteristic of an indicator from the plurality of indicators at the second time based on a data point value, from the second plurality of data point values, of a respective compute device.

4. The method of claim 1, wherein the characteristic is a first characteristic, the method further comprising:
receiving a signal indicating that a data point value from the plurality of data point values and associated with a compute device from the plurality of compute devices is above a threshold; and
sending a signal to display the topological map that includes the plurality of indicators, a second characteristic of the indicator from the plurality of indicators based on the data point value of the compute device being above the threshold.

5. The method of claim 4, wherein the second characteristic of the indicator is a flashing color characteristic.

6. The method of claim 1, wherein the plurality of data point values are a first plurality of data point values, further comprising:
sending a signal to display a graphical user interface element controllable by a user; and
receiving, in response to a manipulation of the graphical user interface element, an indication of a selection of a data point category; and
sending a signal to display the topological map that includes the plurality of indicators, the characteristic of an indicator from the plurality of indicators based on a data point value, from a second plurality of data point values, of a respective compute device.

7. The method of claim 1, wherein:
the signal to display the topological map includes instructions to display a topological map includes generating a set of tiles in an inset window, a quantity of the set of tiles corresponding to a quantity of the plurality of indicators, and
the inset window changes in size to accommodate the set of tiles.

8. A non-transitory processor-readable medium storing code representing instructions that when executed by a processor cause the processor to:
receive, at a first time, a signal indicative of a selection, in an inset window, of a first data point category;
map a position of the selection in the inset window to position data stored in a database record associated with a portion of compute devices from the plurality of compute devices;
send a signal to display, after the first time and before a second time, a topological map that includes a plurality of indicators and a set of tiles in an inset window, a number of tiles within the set of tiles corresponding to a number of indicators within the plurality of indicators, each indicator from the plurality of indicators associated with a compute device from the portion of compute devices from a plurality of compute devices, a characteristic of each indicator from the plurality of indicators based on a data point value of an associated compute device from the plurality of compute devices, the data point value being associated with the first data point category, the signal including instructions to display the topological map such that each tile in the plurality of tiles changes in size to collectively fit within the inset window;

receive, at the second time, a signal indicative of a selection of a second data point category; and send a signal to display, after the second time, the topological map such that the characteristic of each indicator from the plurality of indicators is based on a data point value, associated with the second data point category, of an associated compute device from the plurality of compute devices.

9. The non-transitory processor-readable medium of claim 8, wherein the first data point category is a repair rate.

10. The non-transitory processor-readable medium of claim 8, wherein the characteristic of each indicator from the plurality of indicators is a relative position of that indicator on a display.

11. The non-transitory processor-readable medium of claim 8, further storing code representing instructions that when executed by a processor cause the processor to send a signal to display, after the first time and before the second time, the topological map in a grid format.

12. The non-transitory processor-readable medium of claim 8, further storing code representing instructions that when executed by a processor cause the processor to send a signal to display, from a time before the first time and until a time after the second time, a scrolling information strip displaying data associated with the plurality of compute devices.

13. The non-transitory processor-readable medium of claim 8, further storing code representing instructions that when executed by a processor cause the processor to send a signal to display, at a third time after the second time, a zoomed-in portion of the topological map in response to a signal indicative of a selection by a user.

14. An apparatus, comprising:

a mapping module configured to receive, via a processor, a plurality of first data point values, each first data point value from the plurality of first data point values associated with a compute device from a plurality of compute devices, when the mapping module receives a signal indicative of a selection of a position in an inset window and of the plurality of first data point values, the mapping module configured to map, via the processor, the position in the inset window selected with position data stored in a database record associated with a portion of compute devices from the plurality of compute devices, the mapping module configured to send, via the processor, a signal to display a topological map including a plurality of indicators and a set of tiles in an inset window, a number of tiles within the set of tiles corresponding to a number of indicators within the plurality of indicators, each indicator from the plurality of indicators associated with a compute device from the portion of compute devices from plurality of compute devices, the signal including instructions to display the topological map such that each tile in the plurality of tiles changes in size to collectively fit within the inset window, the mapping module configured to send a signal to display a characteristic of each indicator from the plurality of indicators based on the first data point value, from the plurality of first data point values, of a respective compute device from the plurality of compute devices.

15. The apparatus of claim 14, wherein:

the mapping module is further configured to receive a plurality of second data point values, each second data point value from the plurality of second data point values associated with a compute device from the plurality of compute devices, and when the mapping module receives a signal indicative of a selection of the plurality of second data point values, the mapping module sends a signal to display the plurality of indicators, the characteristic of each indicator from the plurality of indicators based on the second data point value, from the plurality of second data point values, of a respective compute device from the plurality of compute devices.

16. The apparatus of claim 14, wherein each first data point value from the plurality of first data point values is based on a throughput of a respective compute device from the plurality of compute devices.

17. The apparatus of claim 14, wherein each first data point value from the plurality of first data point values is based on a mean time-between-failure value of a component from the plurality of compute devices.

18. The apparatus of claim 14, wherein:

the mapping module is configured to send a signal to display a graphical user interface element controllable by a user; and the mapping module is configured to receive an indication of a selection of a portion of the compute devices in response to a manipulation of the graphical user interface element.

19. The apparatus of claim 14, wherein the mapping module is configured to send a signal to display an alarm when a first data point value from the plurality of first data point values is above a threshold value.

* * * * *